Sept. 20, 1932.   H. J. WOODALL ET AL   1,878,086
LAMINATED PANEL AND ITS FABRICATION
Filed May 18, 1931

INVENTORS.
Herbert J. Woodall and Meredith S. Randall
BY Parker & Burton
ATTORNEYS.

Patented Sept. 20, 1932

1,878,086

UNITED STATES PATENT OFFICE

HERBERT J. WOODALL AND MEREDITH S. RANDALL, OF DETROIT, MICHIGAN, ASSIGNORS TO WOODALL INDUSTRIES INCORPORATED, OF DETROIT, MICHIGAN, A CORPORATION OF MICHIGAN

LAMINATED PANEL AND ITS FABRICATION

Application filed May 18, 1931. Serial No. 538,368.

This invention relates to improvements in laminated panels and their fabrication.

An object of the invention is the provision of an improved process for or method of fabricating the panel structure described in such earlier application and for fabricating other improved panel structures, and to an improved panel structure itself embodying in part the structure described in such aforementioned application and the characteristics thereof.

Our improved panel structure includes a layer of loosely integrated fibrous material which possesses high insulating properties but which is incapable of retaining a deformed shape and, in many embodiments, is incapable of being bent to a deformed shape without rupture.

One important use for panels of this character is in automobile closed body construction. Such panels must frequently be supplied in various shapes. An example is the dash panel which separates the engine compartment from the body compartment of the automobile. Insulating material possessing high sound and heat insulating properties is ordinarily not susceptible to being bent into various shapes without breakage or is incapable of retaining a deformed shaft after it has been caused to assume it. Its loosely integrated fibrous structure does not respond to such treatment.

An object of our invention is the provision of an improved process whereby such material may be bent into the desired shape and in such a manner that it will retain such a shape.

Another object is the provision of an improved laminated panel including material of high insulating character which may be furnished in many desired shapes and which will permanently retain any shape which it has been caused to assume.

Another object is the provision of a laminated structure including a metal sheet adhesively secured to a compressible fibrous sheet in such a manner as to form a secure jointure therewith throughout its entire expanse.

Another object is the provision of an improved laminated panel structure which may be bent into any desired shape and which will retain such shape and which possesses high sound and heat insulating characteristics and also great strength and durability. Furthermore, this improved laminated panel is provided with surface layers of great strength and toughness and which are resistant to the action of the elements and to other materials such as oil, grease and the like. In addition, the product is relatively inexpensive.

The above desirable characteristics and others will more fully appear from the following description, appended claims and accompanying drawing wherein:

Figure 1:
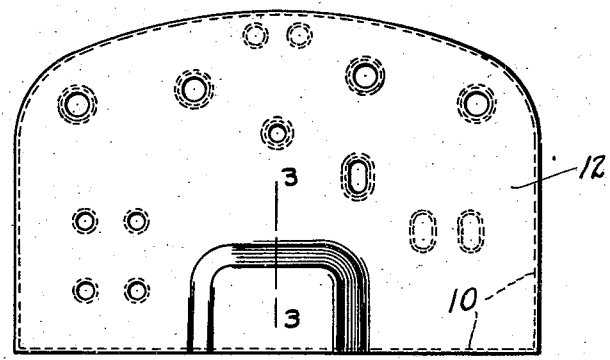
Fig. 1 is a front elevation of a dash panel embodying our invention.

In the application of which this is a continuation in part, claim is made to a laminated panel structure comprising a loosely integrated fibrous layer possessing high sound insulating properties and a thermoplastic layer which is responsive to heat and pressure to assume and retain a deformed shape and which when associated with the insulating layer will hold it to such shape. As a result, insulating material of this character may be used in panels of various shapes.

It has been found that though the insulating material itself is not readily responsive alone to bending and shaping, that when it is associated with the thermoplastic material in sheet form and secured thereto, forming a laminated structure, that such laminated structure may then be bent and shaped as a unit and that the thermoplastic layer or lamination will cause the insulating layer or lamination to follow along and respond to the shaping operation, and that it will hold the insulating layer to the shape it has been caused to assume. This permits the laminated structure being shaped as a unitary sheet into various forms. The thermoplastic layer lamination may be provided in multiple, that is, more than one such layer may be used, and layers thereof may be placed on both sides of the insulating layer if this is desired. The layers of thermoplastic material, which is a highly compacted material possessing a suitable thermoplastic binder holding its fibers together, holds the loosely integrated insulating material in place so that when the laminated structure is bent into various shapes, though rupture of the insulating layer may occur, such breakage will be entirely within the interior of the laminated panel unit and will not cause any damage. The insulating layer is held by the other layers to breakage within certain definite limitations and is prevented from producing a complete break or rupture, and the insulating material is preserved to serve its insulating function as it would had it not been bent or shaped.

The loosely integrated fibrous cellular core furnishes the required insulating against heat and noise and the tough flexible closely compacted outer layers of thermoplastic material which possess relatively low insulating properties, furnish the necessary strength flexibility and protection against breakage, rupture and the elements.

While we do not limit ourselves to any specific commercial product as constituting the best available material for the purpose, it has been found that a material formed of loosely compacted or integrated wood fibers such as is present in the commercial product known as Masonite is highly satisfactory. This material possesses considerable rigidity but little strength. Its fibers are so loosely matted together that myriads of air cells are found in the material and it possesses high sound insulating values and substantial heat insulating capacity. It is not susceptible to bending or shaping without breakage however and it does not possess much resistance to wear and it is not resistant to the action of the elements or the like. Protected within the interior of the panel by the thermoplastic layers it serves admirably the purpose intended.

Furthermore, while we do not limit ourselves to any particular thermoplastic sheet material as constituting the most desirable product for the outer layer or layers of the laminated panel, it has been found that a material formed of closely compacted fibers held together by a heat responsive binder such as asphalt of a particular kind and as represented in the commercial product known as K B board, is highly suitable for use as the outer lamination of the panel.

Figure 2:
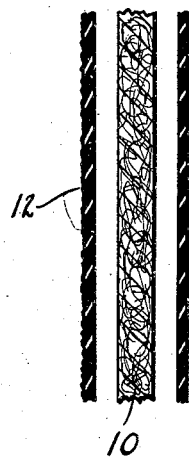
Fig. 2 is a cross-sectional view showing the several laminations of a panel embodying our invention separated from each other.
Figure 3:
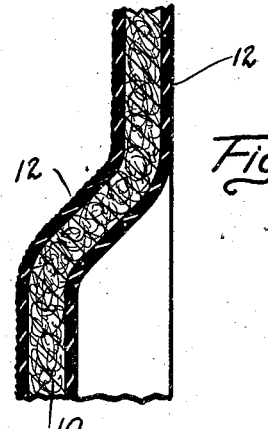
Fig. 3 is a cross-sectional view through a unitary panel structure embodying our invention.

Materials such as these are shown associated together in the application to which reference has been made. Such panel structure is shown in Figs. 2 and 3. Figures 1, 2 and 3, of the instant case are identical with Figures 1, 3 and 4 of the case hereinabove referred to. In these figures of the drawing the insulating layer is indicated as 10. Its loosely matted or integrated fibrous character is clearly apparent. The outer layers or laminations, two being shown, are indicated as 12. In these figures such laminations are shown as positioned on both sides of the insulating layer.

It is a purpose of this invention to firmly secure these outer laminations to one or both sides of the insulating layer when the material is in flat sheet form. The loosely integrated character of the insulating material lends itself to being so adhesively secured with suitable glue or cement. Such glue or cement is preferably of a flexible nature and the loose fibrous character of the insulating material renders its adhesion peculiarly secure notwithstanding variation in shrinkage or expansion of the several layers or laminations of the panel or relative movement thereof produced by shaping or bending the panel.

The complete panel structure is then taken and placed in a suitable press or die stamping machine and subjected to the necessary force to cause it to assume the desired shape. The thermoplastic outer layers should be subjected to heat necessary to render them readily pliable to being bent to a deformed shape. These outer layers respond to such die pressure and carry with them the insulating layer. Breakage or rupture of the insulating layer is limited in scope due to its being held in place and any tendency it might have to resume its normal flat form is restrained by the outer layers retaining their deformed shape and holding it to such shape.

This permits the insulating layer to be brought to its desired shape and form while preserving its insulating characteristics. It also causes it to conform accurately to the shape desired. It eliminates the necessity of cutting or piecing the insulating layer to form unusual shapes or the necessity of endeavoring to shape it alone and hold it intact while applying it to the preformed outer layer or layers, or the necessity of endeavoring to shape it upon such preformed outer layer or layers.

Figure 4:
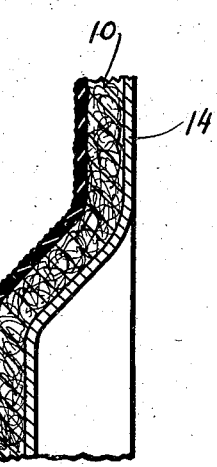
Fig. 4 is a sectional view similar to Fig. 3 illustrating a modified form of construction.
Figure 5:
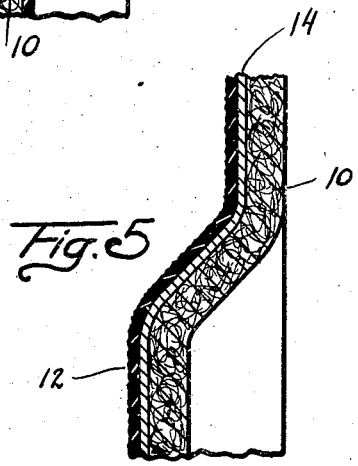
Fig. 5 is a cross-sectional view similar to Fig. 3 showing another modified form of construction.

In Figs. 4 and 5 we have shown a thin relatively soft sheet of metal 14 associated as one lamination in a panel of this character. In Fig. 4 the metal is secured to one side of the insulating layer in place of the thermoplastic sheet material shown in Figs. 2 and 3. In Fig. 5 the metal is secured between the insulating layer and the thermoplastic layer. In each case the metal reinforces the panel structure, rendering it particularly strong and sturdy.

In securing the metal sheet to the insulating sheet or the thermoplastic sheet, whichever the case may be, firm adhesion may be obtained by performing the glue operation under pressure sufficient to force the two laminations into intimate contact throughout their entire areas. Individual laminations of any material vary in thickness and if these materials are of a different character, as for example wood and metal, difficulty is experienced in securing them together so that they will retain their joint notwithstanding variations in expansion and contraction. If adhesion is made under pressure which compresses one of the layers to a uniform thickness not greater than its normal minimum thickness, all points are brought into contact with the metal sheet and secure adhesion results.

In Fig. 5 the metal might serve as the outer layer of an automobile body panel, the insulating layer as the insulation thereof and the thermoplastic layer as the interior finish surface. This type of construction would provide an exceedingly high grade and meritorious article. It would possess all of the advantages of the automobile body construction as now practiced with many important improvements thereover. It would constitute a unitary structure which could be applied as such to form a complete body side wall. It would form an effective insulation against heat and sound. The outer metal layer would form the protection now furnished by the metal sides and the inner thermoplastic layer might be embossed or otherwise suitably decorated to serve as the interior finish within the body.

This improved panel structure may also be built up by adhesively securing the several layers or laminations together as flat sheets and the composite unitary structure may then be formed or shaped as desired as has been hereinabove described. The metal also cooperates to hold the insulating material in place during the shaping operation and to retain it in its permanent shaped form thereafter as hereinabove described.

Relative variation in its expansion or contraction or relative movement of the several layers during the shaping operation is taken care of as hereinabove set forth.

What we claim:
1. That method of shaping a loosely integrated fibrous sheet of insulating material comprising securing on opposite sides thereof sheets of thermoplastic material responsive to heat and pressure to assume and to retain a deformed shape, and then shaping said unitary laminated structure to the desired form.

2. That method of shaping a loosely integrated fibrous sheet of sound insulating material which comprises securing to one side thereof a sheet of material normally responsive to assume and retain a deformed shape under the effect of pressure, and then shaping such laminated sheet structure to the desired form.

3. That method of forming a laminated panel structure comprising securing a layer of loosely integrated fibrous insulating material to a layer of material capable of being shaped under pressure and to permanently retain said shape, and then shaping said laminated structure to the desired form.

4. That method of forming a laminated structure comprising securing a layer of loosely integrated fibrous material normally incapable of being shaped and retaining said shape to a layer of material capable of being shaped under pressure and of retaining such shape, and then bending said laminated structure as a unit to the desired shape.

5. That method of fabricating a laminated panel structure comprising adhesively securing a flat sheet of loosely integrated fibrous material possessing high insulating properties but normally incapable of being shaped and retaining such shape to a flat sheet of closely compacted relatively strong and flexible material capable of being shaped under pressure and of permanently retaining said shape, and then bending the combined laminated structure to the desired shape.

6. That method of fabricating a laminated panel structure comprising adhesively securing a flat sheet of loosely integrated fibrous material possessing high insulating properties but normally incapable of being shaped and retaining such shape between a pair of flat sheets of closely compacted relatively strong and pliable material capable of being shaped under pressure and of permanently retaining said shape and then shaping said laminated structure as desired.

7. A laminated panel structure comprising, in combination, a layer of loosely integrated fibrous material possessing high sound insulating properties, an outer layer of thermoplastic material secured to one side of said first layer, an outer layer of metal secured to the other side of said first layer, said two outer layers being capable of being shaped under the effect of pressure and of permanently retaining said shape and holding the first layer to such shape.

8. A laminated panel structure comprising, in combination, a layer of loosely integrated fibrous material possessing high insulating properties but being substantially incapable of assuming and permanently retaining a deformed shape, a layer of metal and a layer of thermoplastic sheet material secured to said fibrous layer, said layer of metal and of thermoplastic sheet material being responsive to pressure to assume and permanently retain a deformed shape and being capable of holding said fibrous layer at said deformed shape.

In testimony whereof, we, HERBERT J. WOODALL and MEREDITH S. RANDALL sign this specification.

HERBERT J. WOODALL.
MEREDITH S. RANDALL.